United States Patent [19]

Kita et al.

[11] 4,334,426
[45] Jun. 15, 1982

[54] KARMAN VORTEX TYPE FLOW MEASURING APPARATUS

[75] Inventors: Toru Kita, Yokohama; Hiroshi Kobayashi, Yokosuka, both of Japan

[73] Assignee: Nissan Motor Co., Ltd., Yokohama, Japan

[21] Appl. No.: 123,570

[22] Filed: Feb. 22, 1980

[30] Foreign Application Priority Data

Feb. 26, 1979 [JP] Japan .................... 54/20774

[51] Int. Cl.³ .......................................... G01F 1/32
[52] U.S. Cl. .................................. 73/118; 73/861.22
[58] Field of Search ........... 73/861.22, 861.23, 861.24, 73/116, 118; 307/352, 358; 324/77 A, 306

[56] References Cited

U.S. PATENT DOCUMENTS

| | | | |
|---|---|---|---|
| 3,225,213 | 12/1965 | Hinrichs et al. | 324/103 P X |
| 3,832,577 | 8/1974 | Harr | 307/358 X |
| 3,982,434 | 9/1976 | McMurtrie | 73/861.22 |

FOREIGN PATENT DOCUMENTS

| | | |
|---|---|---|
| 1395163 | 5/1975 | United Kingdom . |
| 1408696 | 10/1975 | United Kingdom . |
| 1464934 | 2/1977 | United Kingdom . |
| 1525498 | 9/1978 | United Kingdom . |
| 1529806 | 10/1978 | United Kingdom . |

OTHER PUBLICATIONS

IBM Technical Disclosure Bulletin, vol. 20, No. 8, Jan. 1978, "Threshold Circuit", by Yount, pp. 3199-3200.
"Electronics", Jun. 12, 1975, Auto Firms Look at Thin-Film Meter, pp. 31-32.

*Primary Examiner*—James J. Gill
*Attorney, Agent, or Firm*—Lowe, King, Price & Becker

[57] ABSTRACT

A Karman vortex type flow measuring apparatus comprises a conduit (2) for a fluid whose flow rate or flow velocity is to be measured, and a columnar vortex shedding member (3) extending within the conduit transversely of the fluid flow direction. Frequency of the vortex shedding is detected by a detector (6) whose output electrical signal is compared by a comparator (20) with a slice level signal, to generate a pulse train which is synchronous with the vortex shedding frequency. The slide level is variable in response to fluctuation in the output electrical signal of the detector (6). A highly accurate measurement can be achieved even when the vortex shedding is unstable.

3 Claims, 12 Drawing Figures

KARMAN VORTEX TYPE FLOW MEASURING APPARATUS

The present invention relates to a Karman vortex type flow measuring apparatus and more particularly, to such an apparatus including a conduit through which flows a fluid whose flow rate or flow velocity is to be measured, and a columnar vortex shedding member extending within the conduit transversely of the flow direction of the fluid, the flow rate or flow velocity of the fluid being measured by detecting the frequency of the vortex shedding induced by the vortex shedding member.

The present invention is to enable stable output pulse trains to be generated synchronously with the vortex shedding even when flow rate of suction air supplied to a vehicle engine is to be measured. In such a case, the fluid flow itself fluctuates remarkably, and the flow velocity varies considerably so that the intensity of vortices induced by the vortex shedding member becomes unstable.

FIGS. 1 to 3 show one example of a conventional apparatus which is used to measure the flow rate of the vehicle engine suction air. As shown in FIG. 1, an air cleaning device 1 is connected to an engine 8 through a suction conduit 2 having therein a columnar obstruction or a vortex shedding member 3 which extends transversely of the flow direction of the suction air, and a throttle valve 4 located downstream of the vortex shedding member 3. Referring to FIG. 2 which shows a detailed arrangement of the vortex shedding member, provision of the vortex shedding member 3 centrally of the conduit 2 and transversely of the flow direction of the suction air ensures Karman vortices 5 to be generated downstream thereof on opposite sides alternately (on the upper and lower sides in the figure). Since the vortex shedding frequency of the vortices 5 is proportional to the flow rate or flow velocity of the fluid, the flow rate or flow velocity can be measured by detecting the vortex shedding frequency. The vortex shedding frequency can be detected in various manners, e.g. by means of a hot wire fed with heating current.

As shown in FIG. 2, the vortex shedding member 3 is formed with a through bore 7 which extends between the opposite side surfaces of the member 3 where the vortices are induced, so that the fluid flows through the bore 7 alternately in opposite direction in response to generation and separation of the vortices. The through bore 7 is provided therein with a hot wire 6 consisting, for example, of platinum or tungsten, which is fed with a heating current. Since the alternate fluid flow within the bore 7 cools the hot wire 6, resistance of the hot wire 6 varies accordingly. This variation of the resistance takes place synchronously with the frequency of the alternate flow and hence, of the vortex shedding. Thus, the fluid flow rate can be measured by detecting the frequency of the variation in the resistance of the hot wire 6. More particularly, the variation in the resistance of the hot wire 6 is converted into a voltage signal which is supplied to one of the input terminals of a comparator. By slicing the voltage signal at a predetermined threshold level or a slice level, which is supplied to the other of the input terminals of the comparator, pulse signal can be obtained which is synchronous with the vortex shedding.

Conventionally, the slice level is fixed and constant. Although stable Karman vorticies can be obtained when the fluid flow to be measured is stable, unstable fluid flow results in that the vortices are not shed in a stable manner and that the local flow variation around the vortex detecting element induced by the vortex shedding becomes irregular. Thus, the output voltage signal 9 of the vortex detecting element includes, as shown in FIG. 3, a low frequency fluctuating component corresponding to the irregularity of the local flow variation. The output voltage signal 9 which corresponds to the flow velocity within the through bore 7 representing the vortex shedding frequency is hereinafter referred to as a "Karman original signal". In the conventional apparatus in which the Karman original signal 9 includes a low frequency fluctuating component, and is supplied to a comparator and compared with a fixed constant slice level to generate rectangular output pulses, output pulses accurately synchronous with the vortex shedding cannot be generated. This results in the lack of frequency by which an accurate measurement of the fluid flow rate or a correct flow rate signal cannot be expected. For example, as shown in FIG. 3, the Karman original signal 9 indicates that, in the illustrated period, there have been generated nine vortices, whereas the output pulse signal 10 obtained by comparing the Karman original signal with a predetermined slice level 11 indicates that only five vortices have been generated.

An object of the present invention is to provide an improved Karman vortex type flow measuring apparatus which is capable of generating a stable output pulse train accurately synchronous with the vortex shedding even when flow of the fluid to be measured and hence, the vortex shedding is unstable, as is the case in measuring the flow rate of the suction air of a vehicle engine and the like.

According to the present invention, in order to achieve the above-mentioned object, there is provided a Karman vortex type flow measuring apparatus which comprises: means to detect the frequency of the vortex shedding and convert the detected frequency into an electrical signal; a comparator having a pair of input terminals, one of which is supplied with the converted electrical signal, and the other with a slice level signal with which the converted electrical signal is compared; and means to determine the slice level such that the slice level is varied in accordance with the fluctuation of the converted electrical signal; whereby said comparator generates an output pulse signal which is synchronous with the vortex shedding frequency.

Since the Karman original signal representing the frequency of the vortex shedding is compared, according to the present invention, with a slice level which is varied in response to fluctuations of the Karman original signal, and is further converted into an output pulse signal which is accurately synchronous with the vortex shedding frequency, actual number of the generated vortices can be detected accurately and with an excellent signal to noise ratio. In contrast to this, according to a conventional apparatus utilizing a fixed constant slice level, only a smaller number of vortices were detected as stated hereinbefore.

The present invention will now be explained in detail by referring to some preferred embodiments shown in the drawings, in which.

Figure 1:
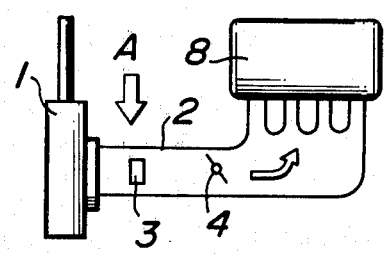
FIG. 1 is a schematic illustration showing a suction air system of a vehicle engine in which suction air flow rate is measured by a Karman vortex type flow measuring apparatus to which the present invention may conveniently be applied.
Figure 2:
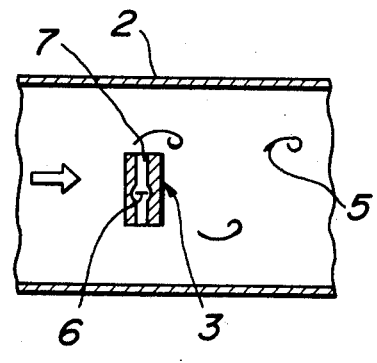
FIG. 2 is a sectional view explaining principle of the Karman vortex type flow measuring apparatus.
Figure 3:
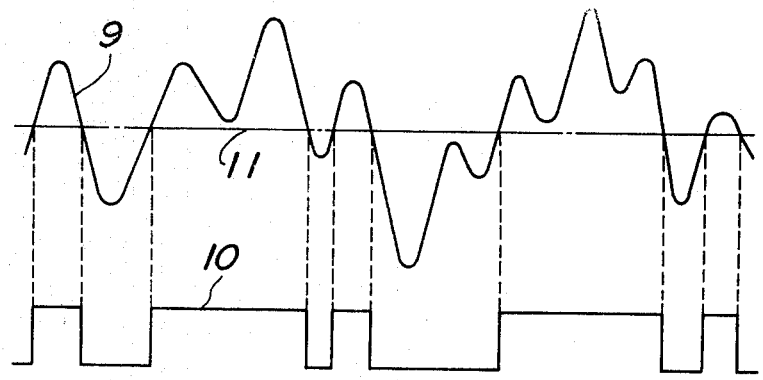
FIG. 3 is a diagram showing the manner of detecting the vortex shedding according to a conventional apparatus.
Figure 4:
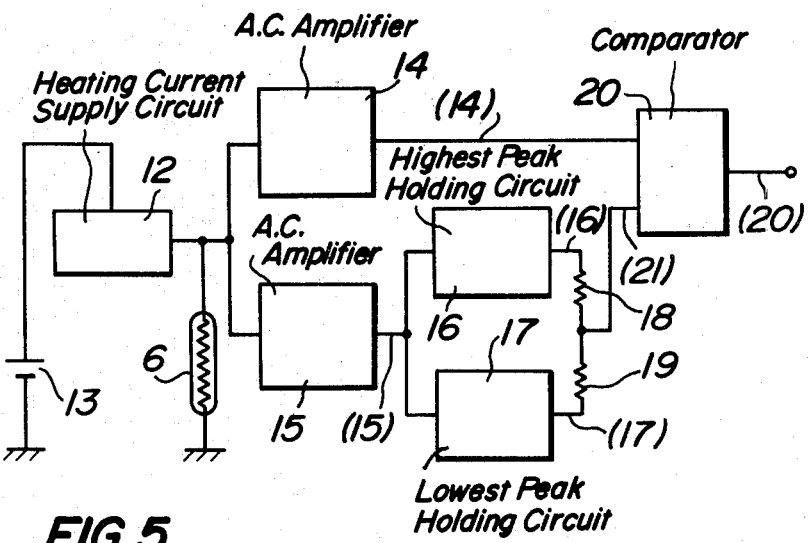
FIG. 4 is a block diagram of the apparatus according to one embodiment of the present invention.
Figure 5:
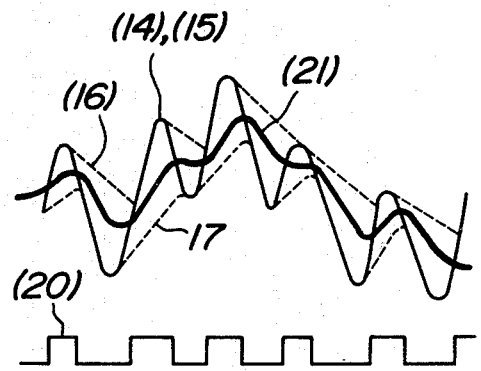
FIG. 5 is a diagram showing waveforms of output signals of the blocks shown in FIG. 4.

FIG. 4 shows a block diagram of the apparatus according to one embodiment of the present invention, and FIG. 5 is a diagram showing waveforms of output signals of each of the blocks shown in FIG. 4. In FIG. 4, reference numeral 12 designates a circuit for supplying the hot wire 6 with a heating current, and 13 a direct current source for the circuit 12. The circuit 12 maintains the hot wire 6 at a substantially constant temperature suitable for detecting the vortex shedding. The hot wire 6 is located in the through bore 7 formed in the vortex shedding member transversely of the fluid flow direction, or in the vicinity of the vortex shedding member on the downstream side, so as to detect displacement of the fluid or variation of the flow velocity within the through bore, or near the vortex shedding member.

Displacement of the fluid around the hot wire 6 cools the hot wire 6 so as to reduce its resistance and to vary the output voltage thereof. This voltage signal is supplied to, and amplified by an A.C. amplifier 14, and is further supplied, as an amplified signal (14), to one of the input terminals of a comparator 20. The output voltage signal of the hot wire 6 is also supplied to, and amplified by an A.C. amplifier 15 which functions as a high pass filter, too, and is further supplied, as an amplified signal (15), to a highest peak holding circuit 16 and a lowest peak holding circuit 17, respectively. The output voltage signals (16), (17) of the peak holding circuits 16, 17 are respectively divided by resistors 18, 19 to generate a mean voltage signal (21). This mean voltage signal (21) is supplied to the other of the input terminals of the comparator 20 as a slice level signal. The output signal (14) of the A.C. amplifier 14 is compared with the slice level signal, so as to generate an output pulse signal (20) accurately corresponding to the vortex shedding frequency.

Figure 6:
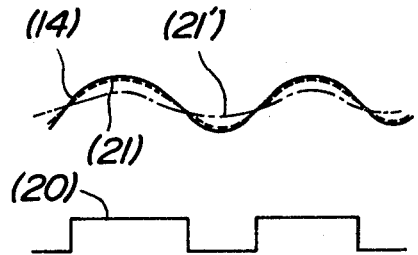
FIG. 6 is a diagram similar to FIG. 5, but in which the Karman original signal has a low frequency.
Figure 7:
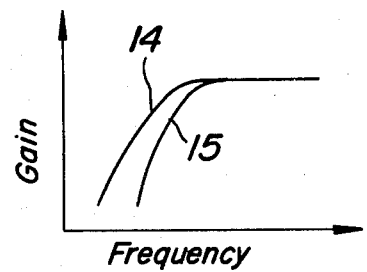
FIG. 7 is a diagram showing frequency characteristics of the A.C. amplifiers shown in FIG. 4.

The peak holding circuits 16, 17 may each consist of a delay circuit including an integration circuit formed by a capacitor C and a resistor R. In view of the fact that the vortex shedding frequency is relatively high in the high flow rate condition, in order to improve the response of each of the peak holding circuits for a high speed fluctuation, the time constant of the CR integration circuits should be small enough. However, in such a case, as the signal frequency for a low flow rate condition is low, the slice level signal (21) and the output signal (14) of the A.C. amplifier 14 will be substantially the same, as shown in FIG. 6, and cannot be compared with each other. In order to obviate such a drawback, the A.C. amplifiers 14 and 15 are designed to have mutually different frequency characteristics, as shown in FIG. 7, such that the A.C. amplifier 15 functions as a high pass filter also. By this measure, in the low frequency range of the vortex shedding, the output voltage signals (14) and (15) become distinct from each other, and the slice level signal changes as shown at (21') in FIG. 6. Thus, the comparator 20 is capable of effecting a positive comparison of the signals (14) and (21') even in the low flow rate condition, and the Karman vortices can be detected accurately for a wide range of the fluid flow rate.

Figure 8:
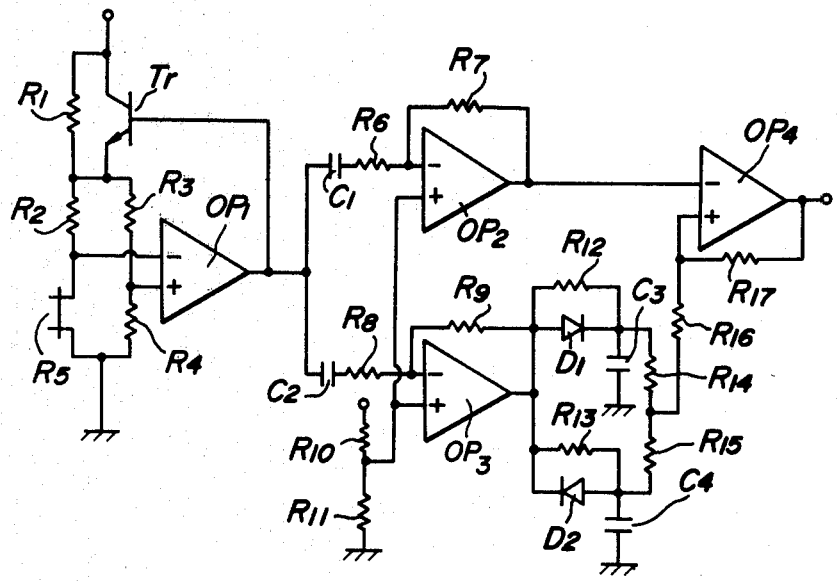
FIG. 8 is a circuit diagram showing one example of the apparatus shown in FIG. 4.

FIG. 8 is a circuit diagram corresponding to the arrangement shown in FIG. 4. A bridge circuit formed by resistors $R_2$, $R_3$ and $R_4$ as well as the hot wire resistor $R_5$ is supplied by a transistor Tr with a heating current. A resistor $R_1$ supplies the bridge circuit with a small current at the time of starting a vehicle engine. The transistor Tr is driven by an unbalanced voltage of the bridge circuit, and controls the heating current so as to reduce the unbalanced voltage, to thereby maintain the hot wire at a substantially constant temperature. The unbalanced voltage of the bridge circuit is amplified by an operational amplifier $OP_1$. Operational amplifiers $OP_2$ and $OP_3$, which respectively form the A.C. amplifiers 14 and 15, are connected to the operational amplifier $OP_1$ in parallel with each other. More particularly, the negative input terminal of the operational amplifier $OP_2$ is connected to the output terminal of the operational amplifier $OP_1$ through a series circuit formed by a capacitor $C_1$ and a resistor $R_6$. Further, the output terminal and the negative input terminal of the operational amplifier $OP_2$ is connected with each other through a resistor $R_7$. Similarly, the operational amplifier $OP_3$ is connected with a series circuit formed by a capacitor $C_2$ and a resistor $R_8$, and with a resistor $R_9$. Gain of each operational amplifier is determined by the ratio of the associated resistors $R_7/R_6$ or $R_9/R_8$, which are adjusted to be substantially identical to each other. Time constant $C_1R_6$ or $C_2R_8$ of each of the series circuits determines each frequency characteristic of the operational amplifier $OP_2$ or $OP_3$. The constant $C_1R_6$ is adjusted to be greater than the constant $C_2R_8$ so that the cut-off frequency of the operational amplifier $OP_3$ is higher than that for the amplifier $OP_2$. A diode $D_1$, capacitor $C_3$ and resistor $R_{12}$ jointly form the highest peak holding circuit while a diode $D_2$, capacitor $C_4$ and resistor $R_{13}$ jointly form the lowest peak holding circuit. Resistors $R_{14}$ and $R_{15}$ having substantially the same resistance respectively divide the output voltage of the peak holding circuits to generate a mean peak voltage signal which is supplied as the slice level signal to an operational amplifier $OP_4$ forming the comparator, to be compared with the output signal of the operational amplifier $OP_2$. Time constant of each peak holding circuit is determined by $C_3R_{12}$ or $C_4R_{13}$. The resistors $R_{14}$ and $R_{15}$ are selected to have a higher resistance than the resistors $R_{12}$ and $R_{13}$.

Figure 9:
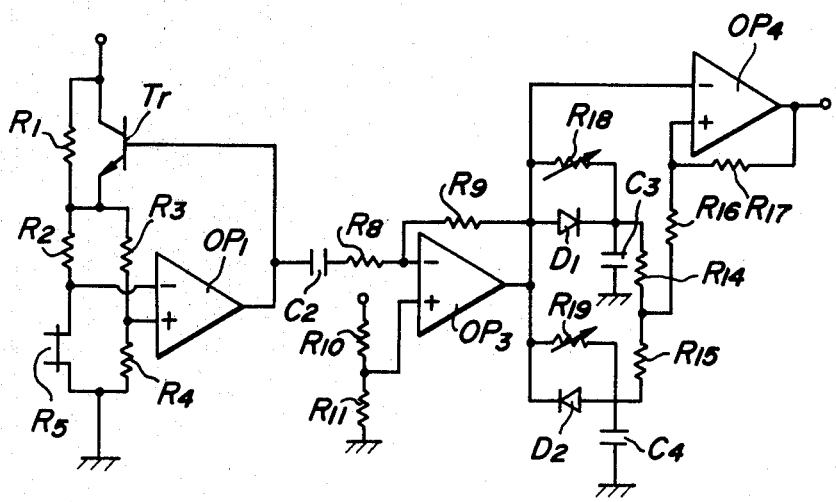
FIG. 9 is a circuit diagram showing another example of the apparatus shown in FIG. 4.

FIG. 9 is a circuit diagram according to another embodiment of the present invention, in which charging and discharging time constant of the highest and the lowest peak holding circuits are regulated by the boosted vacuum pressure in the suction conduit. In case of measuring the flow rate of the suction air to be supplied to a vehicle engine, pulsation of the suction air flow within the suction conduit varies according to the throttle opening and the revolutional speed of the engine which may be used to regulate the time constants of the peak holding circuits. The suction air flow pulsation becomes remarkable at the boosted vacuum pressure of approximately −100 mmHg and, as the vacuum pressure decreases through −50 mmHg up to the full throttle condition, the waveform of the output signal fluctuates gradually due to the augmented instability of the Karman vortex shedding. Thus, in order to improve the response characteristics of the slice level adjusting operation, the charging and discharging time constant of the peak holding circuits should be decreased as the boosted vacuum pressure decreases. In FIG. 9, identical reference characters denote identical or corresponding element, respectively. As shown in this figure, resistors $R_{18}$ and $R_{19}$ respectively determine the charging and discharging time constant of the highest and the lowest peak holding circuits, and consist of variable resistors, whose resistance decreases as the boosted vacuum pressure decreases.

Figure 10:
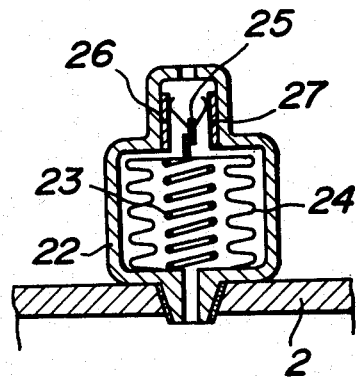
FIG. 10 is a sectional view of variable resistors shown in FIG. 9.
Figure 11:
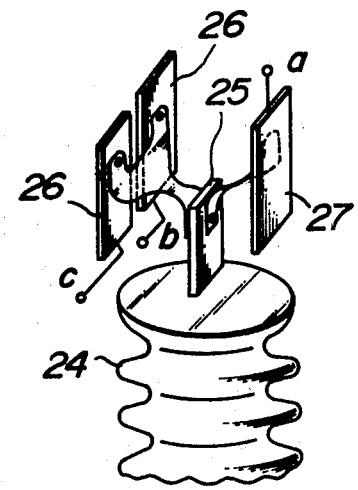
FIG. 11 is a fragmentary perspective view of the variable resistors shown in FIG. 10, with the housing removed.
Figure 12:
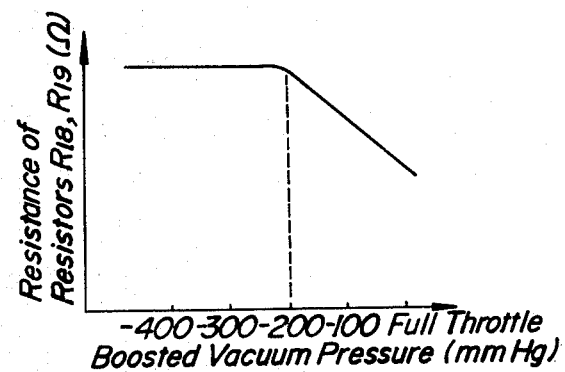
FIG. 12 is a diagram showing one example of characteristics of the variable resistor shown in FIG. 9.

FIGS. 10 and 11 show one example of the device which regulates the variable resistors $R_{18}$ and $R_{19}$, as shown in FIG. 9, corresponding to the boosted vacuum pressure. The device comprises a housing 22 having therein a chamber which communicates with the suction conduit 2. The chamber accommodates a spring 23 which biases a bellow 24 against the vacuum pressure. The bellow 24 is provided with a closed top end carrying thereon a movable member or a slider 25 of variable resistors $R_{18}$ and $R_{19}$, which is made of resilient material and formed with three projections. Each of the projections of the slider 25 slidably contact with resistor bodies 26, 26 and a conductive plate 27, respectively. The conductive plate 27 is connected through a terminal a with the output terminal of the operational amplifier $OP_3$, while the resistor bodies 26, 26 are respectively connected, through terminals b and c, with the capacitors $C_3$ and $C_4$. The arrangement is such that, as the suction vacuum pressure within the conduit 2 varies and the top end of the bellow 24 displaces, the resistance of the resistors $R_{18}$ and $R_{19}$ vary correspondingly. In a preferred embodiment, each of the resistors $R_{18}$ and $R_{19}$ has a resistance which is substantially constant at the boosted pressure of −200 mmHg or more, and which suddenly decreases at the boosted pressure of less than −200 mmHg. By this, even when the Karman vortex detecting signal fluctuates owing to the suction air flow pulsations at the time of sudden acceleration of the vehicle or substantially in the full throttle condition, the slice level can be varied with a stable response and the pulse lack ratio in the output pulse train can be remarkably reduced. Time constant of the resistance variation in accordance with the boosted vacuum pressure may be determined with regard to the piston displacement and/or the number of cylinders of the engine. Other than the mechanically operated variable resistors shown in FIGS. 10 and 11, electrically variable resistors may be used to obtain the same effect.

It is to be understood that the circuits shown in FIGS. 8 and 9 are for examples only of the arrangement according to FIG. 4, and the present invention is not limited to such examples. Those skilled in the art will appreciate that various modifications can be made without departing from the scope of the present invention.

What is claimed is:

1. A Karman vortex type flow measuring apparatus including a duct through which flows a fluid whose flow rate or flow velocity is to be measured, and a columnar vortex shedding member extending within the conduit transversely of the flow direction of the fluid, the flow rate or flow velocity of the fluid being measured by detecting the frequency of the vortex shedding induced by the vortex shedding member, comprising:

means to detect the frequency of the vortex shedding and convert the detected frequency into an electrical signal;

a comparator having a pair of input terminals, one of which is supplied with the converted electrical signal, and the other with a slice level signal with which the converted electrical signal is compared; and means to determine the slice level such that the slice level is varied in accordance with the fluctuation of the converted electrical signal;

said slice level determining means comprising a highest peak holding circuit and a lowest peak holding circuit which respectively hold the highest and the lowest peak voltage levels of the output electrical signal of the detecting means, the slice level determining means generating an output voltage signal which is between the highest and lowest peak voltage levels held by the peak holding circuits, respectively;

said peak holding circuits each comprising a delay circuit having a mutually different charging and discharging time constant, which is varied in response to variation in an operating parameter of a vehicle engine, e.g. revolutional speed of the engine, throttle opening or boosted vacuum pressure in a suction air conduit.

2. The apparatus as claimed in claim 1, wherein said slice level determining means comprises on its input side a high pass filter which suppresses the slice level variation in the low frequency range of the vortex shedding.

3. The apparatus as claimed in claim 2, wherein said delay circuit comprises a capacitor and a resistor both determining the charging and discharging time constant, at least one of which being variable and operated by a bellow or a diaphragm which is displaced by the boosted vacuum pressure in the suction air conduit of a vehicle engine.

* * * * *